United States Patent [19]

Kawazoe

[11] Patent Number: 4,457,610
[45] Date of Patent: Jul. 3, 1984

[54] CAMERA PAN HEAD WITH TILT TENSION CONTROL

[76] Inventor: Michio Kawazoe, 30-11, 5-chome, Naritahigashi, Suginami-ku, Tokyo, Japan

[21] Appl. No.: 362,457

[22] Filed: Mar. 26, 1982

[30] Foreign Application Priority Data

Sep. 21, 1981 [JP] Japan ............................ 56-140802[U]

[51] Int. Cl.³ ...................... G03B 17/00; F16M 11/12
[52] U.S. Cl. ..................................... 354/293; 248/183
[58] Field of Search ................. 354/81, 293; 248/183, 248/185, 179, 184

[56] References Cited

U.S. PATENT DOCUMENTS

| D. 243,328 | 2/1977 | Kawazoe . | |
| 2,461,175 | 2/1949 | Peterson | 248/183 |
| 3,924,828 | 12/1975 | Epperson | 248/179 |
| 4,048,488 | 9/1977 | Kawazoe . | |
| 4,121,799 | 10/1978 | Kawazoe . | |
| 4,123,026 | 10/1978 | Kawazoe . | |
| 4,134,662 | 1/1979 | Kawazoe . | |
| 4,234,149 | 11/1980 | Kawazoe . | |
| 4,240,129 | 12/1980 | Kawazoe . | |
| 4,249,817 | 2/1981 | Blau | 354/193 |
| 4,320,885 | 3/1982 | Kawazoe . | |
| 4,329,735 | 5/1982 | Kawazoe . | |

Primary Examiner—A. A. Mathews
Attorney, Agent, or Firm—Donald D. Mon; David O'Reilly

[57] ABSTRACT

A camera pan head having a precise tilt tension control. The camera pan head is comprised of a L-shaped camera supporting plate rotatably attached to a post on a swivel block rotatably mounted on a tripod. The support plate is a spring biased friction plate and an adjustable cap-nut. Adjustment of the cap-nut adjusts the tilt tension on the friction plate.

11 Claims, 5 Drawing Figures

CAMERA PAN HEAD WITH TILT TENSION CONTROL

FIELD OF THE INVENTION

This invention relates to a camera pan head or a camera bed mounting a camera on a tripod.

BACKGROUND OF THE INVENTION

In a conventional camera pan head, the center of gravity of a camera is easily displaced often causing the camera to fall over and be damaged by excess tilting when the camera is tilted forward, backward, rightward or leftward. A heavier camera causes this tendency to increase. In order to prevent these accidents, a camera lock is required in order to prevent the camera from rotating whenever the camera angle is changed. However, often there is not enough time to lock the camera each time, such as when a movie projector or a video tape camera is used. For the above mentioned cases another type of camera was proposed, which has a spring with which a camera supporting plate is sprung back to neutral position whenever the camera angle is changed. However, in the proposed camera, the spring restoring force increases with increase in camera tilting angle, resulting in difficult operation and restriction of rotating motion. Moreover, the camera is instantaneously sprung back to the neutral position whenever the hand is released.

BRIEF DESCRIPTION OF THE INVENTION

The object of this invention is to provide a camera head pan having none of these defects. It is therefore the principal object of this invention to provide a new sophisticated camera pan head having a precise tilt tension control for rotating the supporting plate by applying adjustable frictional force, in which accidental over tilting of the camera is prevented and the camera is kept in a desired position even if the hand is released.

The above and other features of the invention will be fully understood from the following description and the accompanying drawings, in which:

DETAILED DESCRIPTION OF THE INVENTION

Figure 1:
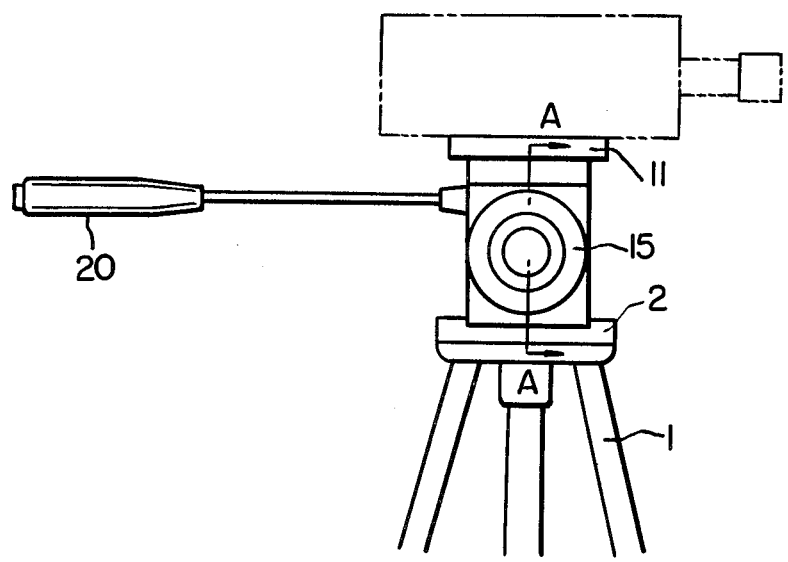
FIG. 1 is a side view of a camera pan head according to one embodiment of this invention.
Figure 2:
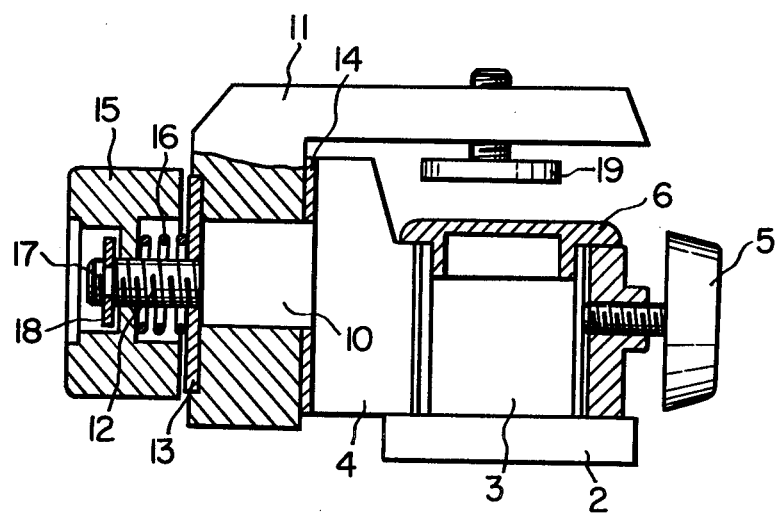
FIG. 2 is a cross-sectional view taken along line A—A of FIG. 1.
Figure 5:
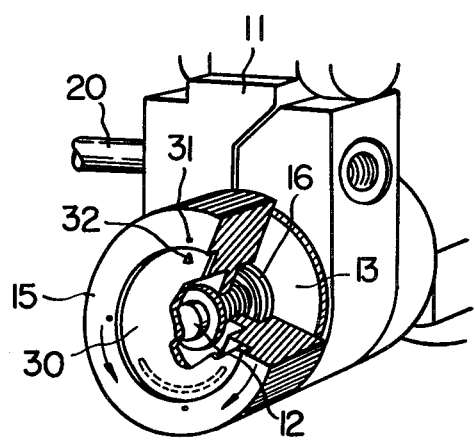
FIG. 5 is a perspective view of still another more practical embodiment in which the same numerals identify the same part as FIG. 1 and FIG. 2 throughout.

As shown in FIG. 1 and FIG. 2, a vertical post 3 having an axis is provided by the center of a base plate 2 attached to a tripod 1. A swivel block 4 having a tightening screw 5 is rotatably inserted onto said post 3. A cap 6 is fixed on the top end of said vertical post 3 to prevent the swivel block from falling off. A horizontally extending post 10 having an axis is connected with said swivel block 4. A L-shaped camera supporting plate 11 is rotatably mounted by insertion on said post 10. A threaded shaft 12, extending outward through said supporting plate 11, is integrally connected to the end face of said post 10. A frictional plate 13 is set on the same end of the post 10, with the plate 13 in frictional engagement with the outside face of the supporting plate 11, which frictional plate 13 is inserted to prevent rotation about the post 10. A second frictional plate 14 is also positioned between the swivel block 4 in frictional engagement with the inner side of said supporting plate 11. An adjusting cap-nut or control dial 15 is engaged with said threaded shaft 12 and a spring 16 is inserted and compressed between said adjusting cap-nut 15 and said frictional plate 13, so as to push said frictional plate 13 against the supporting plate 11. A snap-lock, E-ring 18 is inserted in an annular groove 17 formed on the top end of the shaft to prevent the cap-nut 15 from falling off the shaft 12. A camera attachment bolt 19, for camera mounting or releasing is loosely inserted in the supporting plate 11. A threaded handle 20 is provided for positioning the supporting plate 11 and tightly clamping it, if desired, to the post 10 as shown in FIGS. 1 and 5.

In this device, the supporting plate 11 can be rotated about the axis of vertical post 3 in horizontal plane and also can be rotated forward or backward in a vertical plane about the axis of post 10. When the supporting plate 11 is rotated, frictional force or tilt tension produced by the frictional engagement, the frictional plate 13 with supporting plate is applied in opposition to the rotation. Dialing said adjusting cap-nut 15 makes it possible to change the pressure of the spring 16, resulting in a change in frictional force applied by frictional plate 13. Therefore tilt tension can be varied and controlled with the adjusting cap-nut 15. The change in pressure of spring 16 causes a change also in frictional force between the second frictional plate 14 and said supporting plate 11. Tilt tension can be more closely controlled with both frictional plates 13 and 14.

In this embodiment, frictional plate 13 is inserted to prevent rotation about the axis of post 10, while frictional plate 13 is in frictional engagement with the supporting plate 11. However, the relative axial rotation of post 10 and supporting plate 11 can be exchanged by reversing parts.

Moreover in this embodiment, the frictional force produced when a mounted camera is bounced, (i.e., rotated forward or backward) can be controlled with frictional force produced when tilted rightward or leftward, controlled by the same means.

Figure 3:
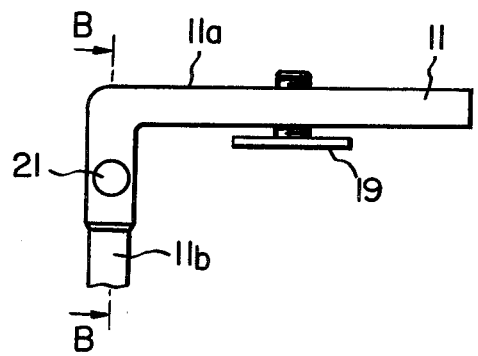
FIG. 3 is a front view of a camera supporting plate of another embodiment of the invention.
Figure 4:
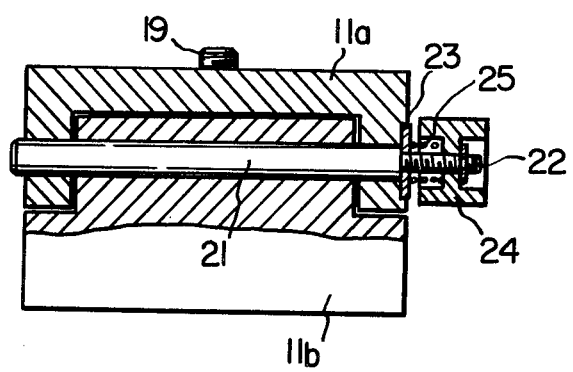
FIG. 4 is a cross-sectional view taken along line B—B of FIG. 3.

FIG. 3 and FIG. 4 shows another embodiment designed for the above-mentioned purpose. Horizontal part 11a of camera supporting plate 11 is connected with vertical part 11b, so as to rotate or tilt rightward or leftward about the axis of pin 21, which is in integral engagement with said vertical part 11b. As shown in FIG. 4, a threaded shaft 22 is provided on the end of said pin 21, and a frictional plate 23 is set at the threaded end of said pin 21, so as to prevent rotation. An outer face of said frictional plate 23 is in frictional engagement with the horizontal part 11a. A compressed spring 25 is provided to press said frictional plate 23 against the horizontal part and fit into adjusting cap-nut 24 screwed onto threaded shaft 22.

In this device, dialing or rotating the adjusting cap-nut 24 varies the pressure or frictional force applied by said frictional plate 23 against horizontal part 11a, so that frictional force can be controlled.

According to this invention, tilting tension or frictional force against camera rotation can be controlled in proportion to the weight of the camera.

As shown in FIG. 5, a face plate 30, also serving as a scale plate, is fixed to the end of the threaded shaft 12. Scales 31, 32 are marked both on the rim of the face plate 30 and on the end of the adjusting cap-nut 15.

This invention is not to be limited by the embodiments shown in the drawings and described in the description, which are given by way of example and not of limitation, but only in accordance with the scope of the appended claims.

I claim:

1. A camera pan head comprising: a base plate fixed on a tripod; a swivel block mounted on said base plate; a post having an axis connected to said swivel block; a tiltable camea supporting plate rotatably supported on said post; an outward extending threaded shaft fixed to said post; a frictional plate set on said post for applying frictional force to said camera supporting plate and a compressed spring between an adjusting cap-nut threadably engaged with said threaded shaft, and said frictional plate for pressing said frictional plate against said supporting plate thereby providing positive camera tilt control.

2. A camera pan head for a tripod comprising:
a base plate having a post attached to said tripod;
swivel block means rotatably secured on said base plate; said swivel block having an outward extending post;
camera support plate means rotatably mounted on said swivel block post;
a threaded shaft on said swivel block post;
a nut threaded on said threaded shaft;
friction means between said nut and said camera support plate means;
compression means between said nut and said camera support plate means pressing said friction means against said camera support plate means whereby said friction means adjustably secures said camera support plate means on said swivel block post.

3. The pan head according to claim 2 in which said nut is adjustable to adjust the compression force on said compression means thereby changing the frictional force of said friction means.

4. The pan head according to claim 3 in which said compression means is a coil spring.

5. The pan head according to claim 4 including a second friction means mounted on said swivel block post between said camera support plate and said swivel block.

6. The pan head according to claim 5 including a face plate mounted on the end of said threaded shaft, said face plate and said nut having mutually adjacent calibration marks to provide a scale for frictional adjustment of said nut.

7. The pan head according to claim 1 in which said camera supporting plate is comprised of a vertical plate and a horizontal plate, said horizontal plate being rotatably secured to said vertical plate by a pin integral with said vertical plate; and frictional engagement means on the end of said pin for controlling the rotation of said horizontal plate around the axis of said pin.

8. The pan head according to claim 7 in which said frictional engagement means comprises; a threaded shaft on said pin, a second cap-nut threaded on said threaded pin shaft, and adjustable friction means between said second cap-nut and said horizontal plate.

9. The pan head according to claim 8 in which said adjustable friction means comprises a second friction plate abutting the horizontal plate and compression means between said second friction plate and said second cap-nut.

10. The pan head according to claim 9 in which said compression means comprises a coil spring.

11. The pan head according to claim 2 including a second friction means mounted on said swivel block post between said camera support plate means and said swivel block.

* * * * *